(12) United States Patent  
Moriya et al.

(10) Patent No.: US 11,087,794 B2  
(45) Date of Patent: Aug. 10, 2021

(54) MAGNETIC RECORDING MEDIUM HAVING MAGNETIC LAYER WITH A GRANULAR STRUCTURE

(71) Applicant: FUJI ELECTRIC CO., LTD., Kawasaki (JP)

(72) Inventors: Tomohiro Moriya, Matsumoto (JP); Hitoshi Nakata, Matsumoto (JP); Takehito Shimatsu, Sendai (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 237 days.

(21) Appl. No.: 15/994,470

(22) Filed: May 31, 2018

(65) Prior Publication Data

US 2018/0286445 A1 Oct. 4, 2018

Related U.S. Application Data

(63) Continuation of application No. PCT/JP2017/017764, filed on May 10, 2017.

(30) Foreign Application Priority Data

Jun. 23, 2016 (JP) .............................. JP2016-124731

(51) Int. Cl.
*G11B 5/73* (2006.01)
*G11B 5/65* (2006.01)
(Continued)

(52) U.S. Cl.
CPC .............. *G11B 5/7377* (2019.05); *G11B 5/65* (2013.01); *G11B 5/66* (2013.01); *G11B 5/70626* (2013.01); *G11B 5/7369* (2019.05); *G11B 5/7379* (2019.05)

(58) Field of Classification Search
None
See application file for complete search history.

(56) References Cited

U.S. PATENT DOCUMENTS 6,468,670 B1 * 10/2002 Ikeda .................. G11B 5/66  
428/611  
8,241,766 B2 * 8/2012 Lu ..................... G11B 5/314  
360/131

(Continued)

FOREIGN PATENT DOCUMENTS

JP  02071424 A  *  3/1990  
JP  2007-299492 A    11/2007

(Continued)

OTHER PUBLICATIONS

Abstract Translation of JP 2015-041392 A (Year: 2015).*

(Continued)

*Primary Examiner* — Kevin M Bernatz  
(74) *Attorney, Agent, or Firm* — Rabin & Berdo, P.C.

(57) ABSTRACT

The invention provides a magnetic recording medium including a magnetic layer or a magnetic recording layer having a granular structure in which magnetic crystal grains are well separated from each other. The magnetic recording medium includes a substrate, a seed layer, and a magnetic recording layer, wherein the magnetic recording layer includes a first magnetic layer which is a continuous film consisting of an ordered alloy, and a second magnetic layer having a granular structure consisting of magnetic crystal grains consisting of an ordered alloy and a non-magnetic crystal grain boundary, and the seed layer consists of a material selected from the group consisting of an NaCl-type compound, a spinel-type compound, and a perovskite-type compound.

10 Claims, 3 Drawing Sheets

(51) Int. Cl.
*G11B 5/66* (2006.01)
*G11B 5/706* (2006.01)

(56) References Cited

U.S. PATENT DOCUMENTS

| | | | | |
|---|---|---|---|---|
| 9,646,640 | B2* | 5/2017 | Furuta | G11B 5/65 |
| 10,020,016 | B2* | 7/2018 | Uchida | G11B 5/65 |
| 10,115,424 | B2* | 10/2018 | Moriya | G11B 5/65 |
| 10,152,996 | B2* | 12/2018 | Yoshizawa | G11B 5/66 |
| 10,276,200 | B2* | 4/2019 | Moriya | G11B 5/7379 |
| 10,504,547 | B2* | 12/2019 | Nakata | G11B 5/65 |
| 10,566,019 | B2* | 2/2020 | Kataoka | G11B 5/65 |
| 2006/0204791 | A1* | 9/2006 | Sakawaki | G11B 5/65 428/828.1 |
| 2007/0160824 | A1* | 7/2007 | Ichihara | G11B 5/82 428/304.4 |
| 2007/0292720 | A1* | 12/2007 | Suess | G11B 5/64 428/828.1 |
| 2008/0292907 | A1* | 11/2008 | Berger | G11B 5/66 428/828 |
| 2009/0040644 | A1 | 2/2009 | Lu et al. | |
| 2009/0226762 | A1* | 9/2009 | Hellwig | G11B 5/66 428/815 |
| 2011/0311841 | A1* | 12/2011 | Saito | G11B 5/66 428/848.1 |
| 2012/0225325 | A1* | 9/2012 | Nemoto | G11B 5/66 428/829 |
| 2012/0300600 | A1* | 11/2012 | Kanbe | G11B 5/66 369/13.32 |
| 2013/0040167 | A1* | 2/2013 | Alagarsamy | G11B 5/851 428/831.2 |
| 2013/0170075 | A1 | 7/2013 | Dai et al. | |
| 2013/0293983 | A1 | 11/2013 | Hirayama et al. | |
| 2014/0044993 | A1* | 2/2014 | Li | G11B 5/66 428/828 |
| 2014/0104724 | A1 | 4/2014 | Shiroishi et al. | |
| 2014/0308542 | A1* | 10/2014 | Zhang | G11B 5/7325 428/831.2 |
| 2015/0016236 | A1* | 1/2015 | Sakawaki | G11B 5/66 369/13.24 |
| 2015/0029830 | A1* | 1/2015 | Zhang | G11B 5/7325 369/13.4 |
| 2015/0138939 | A1* | 5/2015 | Hellwig | G11B 5/65 369/13.41 |
| 2016/0148632 | A1* | 5/2016 | Hellwig | G11B 5/7379 360/75 |
| 2016/0267934 | A1 | 9/2016 | Furuta et al. | |
| 2017/0018286 | A1* | 1/2017 | Hu | G11B 5/8404 |
| 2017/0169850 | A1 | 6/2017 | Yoshizawa et al. | |
| 2017/0243605 | A1* | 8/2017 | Lu | G11B 5/66 |
| 2017/0270955 | A1* | 9/2017 | Kataoka | G11B 5/7379 |

FOREIGN PATENT DOCUMENTS

| | | |
|---|---|---|
| JP | 2009-059461 A | 3/2009 |
| JP | 2013-232269 A | 11/2013 |
| JP | 2014-081981 A | 5/2014 |
| JP | 2015-005326 A | 1/2015 |
| JP | 2015041392 A * | 3/2015 |
| JP | 2016-040748 A | 3/2016 |
| WO | 2016024403 A1 | 2/2016 |

OTHER PUBLICATIONS

Abstract Translation of JP 02-071424 A (Year: 1990).*
R.F. Penoyer, "Automatic Torque Balance for Magnetic Anisotropy Measurements", The Review of Scientific Instruments, vol. 30, No. 8, pp. 711-714, Aug. 1959.
Soshin Chikazumi, "Physics of ferromagnetism vol. II", Shokabo Co., Ltd., pp. 10-21.

* cited by examiner

MAGNETIC RECORDING MEDIUM HAVING MAGNETIC LAYER WITH A GRANULAR STRUCTURE

CROSS-REFERENCE TO THE RELATED APPLICATION

This application is a continuation application of PCT Application No. PCT/JP2017/017764 filed on May 10, 2017 under 37 Code of Federal Regulation § 1.53 (b) and the PCT application claims the benefit of Japanese Patent Application No. 2016-124731 filed on Jun. 23, 2016, the above applications being hereby incorporated by reference wherein in its entirety.

FIELD OF THE INVENTION

The present invention relates to a magnetic recording medium. In particular, the present invention relates to a magnetic recording medium used in a hard disc magnetic recording device (HDD).

DESCRIPTION OF THE RELATED ART

Perpendicular magnetic recording system is adopted as a technique for achieving high-density magnetic recording. A perpendicular magnetic recording medium at least comprises a non-magnetic substrate and a magnetic recording layer formed of a hard-magnetic material. Optionally, the perpendicular magnetic recording medium may further comprise: a soft-magnetic under layer which is formed from soft-magnetic material and plays a role in concentrating the magnetic flux generated by a magnetic head onto the magnetic recording layer; an interlayer for orienting the hard-magnetic material in the magnetic recording layer in an intended direction; a protective layer for protecting the surface of the magnetic recording layer; and the like.

The magnetic recording layer of the perpendicular magnetic recording medium formed of a granular magnetic material has been proposed, for the purpose of obtaining good magnetic properties. The granular magnetic material comprises magnetic crystal grains and a non-magnetic body segregated to surround the magnetic crystal grains. Respective magnetic crystal grains in the granular magnetic material are magnetically separated from each other with the non-magnetic body.

For the purpose of further increasing the recording density of the perpendicular magnetic recording medium, a need for reduction in the grain diameter of the magnetic crystal grains in the granular magnetic material arises in recent years. On the other hand, the reduction in the grain diameter of the magnetic crystal grains leads to a decrease in thermal stability of the recorded magnetization (signals). Thus, the magnetic crystal grains in the granular magnetic material need to be formed of a material with higher magnetocrystalline anisotropy, in order to compensate the decrease in thermal stability due to the reduction in the grain diameter of the magnetic crystal grains. Various $L1_0$ ordered alloys are proposed as the material having the required higher magnetocrystalline anisotropy. Typical $L1_0$ ordered alloys include FePt, CoPt, FePd, CoPd, and the like.

It has been attempted to improve separation of the magnetic crystal grains in the magnetic recording layer having the granular structure containing the $L1_0$ ordered alloys by means of the layer formed under the magnetic recording layer. For example, United States Patent Application Publication No. 2013/0170075 proposes formation of a magnetic recording layer having a granular structure comprising $L1_0$ FePtX magnetic crystal grains and a non-magnetic crystal grain boundary onto a seed layer having a discrete island-shaped structure comprising FePt, the seed layer being formed on an underlayer comprising MgO, SiN or TiC. In this proposal, the $L1_0$ FePtX magnetic crystal grains in the magnetic recording layer are formed on the FePt grains constituting the seed layer which act as starting points, while the non-magnetic crystal grain boundary is formed in the area where the underlayer is exposed.

Also, Japanese Patent Laid-open No. 2013-232269 proposes a magnetic recording medium comprising a recording layer consisting of FePt and $SiO_2$ and a resonance layer consisting of FePt and C, for the purpose of shrinking the sizes of recording bits in the magnetic recording medium for microwave-assisted recording. In this proposal, the recording layer consisting of FePt and $SiO_2$ has a structure in which the FePt crystal grains are connected in a continuous manner, without segregation of $SiO_2$ in the crystal grain boundary.

Further, Japanese Patent Laid-open No. 2014-081981 proposes a magnetic recording medium for microwave-assisted recording, the medium comprising a magnetic recording layer has a stacked structure in which the top layer is a magnetic artificial lattice film. This proposal reports that the magnetic recording layer having a desired distribution of anisotropic magnetic field (Hk) is obtained by disposing the magnetic artificial lattice film as the top layer and magnetic recording layers having a granular structure under the top layer. This proposal discloses an example (sample C5) having a stacked structure in which the bottom layer of a three-layered magnetic recording layer has a granular structure comprising $L1_1$ CoPt-based ordered alloy magnetic crystal grains and a $(Ti_{0.8}Si_{0.2})$ $O_2$ non-magnetic crystal grain boundary, as one of constitutional example.

On the other hand, a seed layer such as MgO is generally used for imparting an orientation suitable to perpendicular magnetic recording to $L1_0$ ordered alloys. However, it is known that it is difficult to form a magnetic recording layer having a granular structure consisting of $L1_0$ ordered alloy magnetic crystal grains and a non-magnetic crystal grain boundary consisting of an oxide, onto the MgO seed layer. Regarding to this problem, Japanese Patent Laid-open No. 2015-005326 proposes to decrease the content of the non-magnetic crystal grain boundary in the magnetic recording layer, in the direction from the bottom to the top of the magnetic recording layer.

SUMMARY OF INVENTION

There is still a need for a magnetic recording medium comprising a magnetic layer or magnetic recording layer having a granular structure in which magnetic crystal grains are well separated from each other.

One of constitutional examples of the present invention is a magnetic recording medium comprising a substrate, a seed layer, and a magnetic recording layer, wherein the magnetic recording layer comprises a first magnetic layer which is a continuous film consisting of an ordered alloy, and a second magnetic layer having a granular structure consisting of magnetic crystal grains consisting of an ordered alloy and a non-magnetic crystal grain boundary, and the seed layer consists of a material selected from the group consisting of an NaCl-type compound, a spinel-type compound, and a perovskite-type compound. Here, the NaCl-type compound may be selected from the group consisting of MgO, ZnO, CaO, SrO, TiN, CrN, and ZrN. The spinel-type compound may be selected from the group consisting of $MgAl_2O_4$, $FeAl_2O_4$, $ZnAl_2O_4$, $FeCr_2O_4$, and $MgCr_2O_4$. The perovskite-type compound may have a general formula $ABO_3$ wherein A is selected from the group consisting of Ba, Pb, Sr, Mg and Ca, and B is selected from the group consisting of Ti, Zr, Hf, and Sn. Further, the non-magnetic crystal grain boundary in the second magnetic layer may comprise an oxide. The oxide may be selected from the group consisting of $TiO_2$, $SiO_2$, and $Al_2O_3$.

Further, the ordered alloy in the first magnetic layer and the ordered alloy in the second magnetic layer may be independently an alloy of at least one element selected from the group consisting of Fe and Co, and at least one element selected from the group consisting of Pt and Pd. Each of the ordered alloys in the first magnetic layer and the second magnetic layer may further comprise at least one element selected from the group consisting of Ru, Rh, Ir, Ni, Mn, Cu, Au, and Ag.

By adopting the above-described constitution, it is possible to provide a magnetic recording medium having a magnetic recording layer comprising a magnetic layer having a granular structure in which magnetic crystal grains are well separated from each other. The magnetic recording layer of the above-described constitution has a larger perpendicular-to-plane coercive force than conventional magnetic recording layers in which a layer of an ordered alloy-oxide granular structure is formed on a layer of an ordered alloy-carbon granular structure.

Further features of the present invention will become apparent from the following description of exemplary embodiments (with reference to the attached drawings).

DESCRIPTION OF THE EMBODIMENTS

Figure 1:
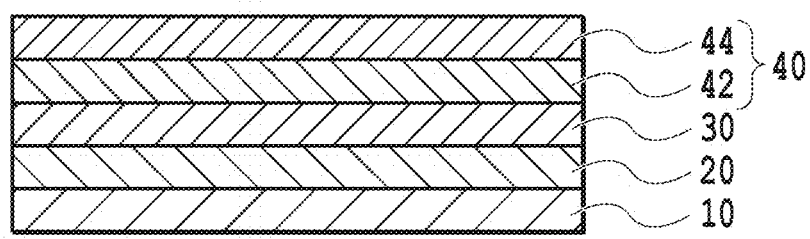
FIG. 1 is a schematic cross-sectional view showing one of constitutional examples of magnetic recording media of the present invention.

One of constitutional examples of the present invention is a magnetic recording medium comprising a substrate, a seed layer, and a magnetic recording layer. The magnetic recording layer comprises a first magnetic layer which is a continuous film consisting of an ordered alloy, and a second magnetic layer having a granular structure consisting of magnetic crystal grains consisting of an ordered alloy and a non-magnetic crystal grain boundary. The seed layer consists of a material selected from the group consisting of an NaCl-type compound, a spinel-type compound, and a perovskite-type compound. Further, the magnetic recording medium of this constitutional example may further comprise layers commonly known in the art, such as an adhesive layer, a soft-magnetic under layer (soft-magnetic back layer) and/or a heat sink layer, between the substrate and the seed layer, or between the substrate and the interlayer. In addition, the magnetic recording medium of this constitutional example may further comprise layers commonly known in the art, such as a protective layer and/or a liquid lubricant layer, on or over the magnetic recording layer. FIG. 1 shows one of constitutional examples of the magnetic recording medium, which comprises substrate 10, interlayer (underlayer) 20, seed layer 30, and magnetic recording layer 40 consisting of first magnetic layer 42 and second magnetic layer 44.

The substrate 10 may be various plate-shaped member having a flat surface. For example, the substrate 10 may be formed of a material commonly used in magnetic recording media. The useful material includes a NiP-plated Al alloy, monocrystalline MgO, $MgAl_2O_4$, $SrTiO_3$, tempered glass, crystallized glass, and the like.

The adhesive layer (not shown), which may be formed optionally, is used for enhancing the adhesion between the layer formed on the adhesive layer and the layer formed under the adhesive layer. The layer formed under the adhesive layer includes the substrate 10. The material for forming the adhesive layer includes metals such as Ni, W, Ta, Cr and Ru, or an alloy containing the above-described metals. The adhesive layer may be a single layer or have a stacked structure with plural layers. The adhesive layer preferable in this constitutional example consists of CrTi. As used herein, the description "sputtering method" encompasses any technique known in the art, such as a DC magnetron sputtering method and an RF magnetron sputtering method.

The soft-magnetic under layer (not shown), which may be formed optionally, controls the magnetic flux emitted from a magnetic head to improve the read-write characteristics of the magnetic recording medium. The material for forming the soft-magnetic under layer includes: a crystalline material such as an NiFe alloy, a sendust (FeSiAl) alloy, or a CoFe alloy; a microcrystalline material such as FeTaC, CoFeNi or CoNiP; and an amorphous material including a Co alloy such as CoZrNb or CoTaZr. The optimum thickness of the soft-magnetic under layer depends on the structure and characteristics of the magnetic head used in magnetic recording. When forming the soft-magnetic under layer continuously with other layers, the soft-magnetic under layer preferably has a thickness in a range from 10 nm to 500 nm (both inclusive), in view of productivity. The soft-magnetic under layer may be formed by any process known in the art, such as a sputtering method or a vacuum deposition method.

The heat sink layer (not shown) may be optionally provided when the magnetic recording medium of the present invention is used in a heat-assisted magnetic recording system. The heat sink layer is a layer for effectively absorbing excess heat of the magnetic recording layer 40 that is generated during the heat-assisted magnetic recording. The heat sink layer can be formed of a material having a high thermal conductivity and a high specific heat capacity. Such material includes elemental Cu, elemental Ag, elemental Au, or an alloy material composed mainly of these elements. As used herein, the expression "composed mainly of" means that the content of the concerned material is 50% by weight or more. In consideration of its strength or the like, the heat sink layer can be formed of an Al—Si alloy, a Cu—B alloy, or the like. Further, the function of the soft-magnetic under layer, that is, the function of concentrating a perpendicular magnetic field generated by the head to the magnetic recording layer 40, can be imparted to the heat sink layer by forming the heat sink layer of a sendust (FeSiAl) alloy, a soft-magnetic CoFe alloy, or the like. The optimum thickness of the heat sink layer depends on the amount and distribution of the heat generated during the heat-assisted magnetic recording, as well as the layer configuration of the magnetic recording medium and the thickness of the respective constituent layers. When forming the heat sink layer continuously with other constituent layers, the heat sink layer preferably has a thickness of 10 nm or more and 100 nm or less, in view of productivity. The heat sink layer can be formed by any process known in the art, such as a sputtering method or a vacuum deposition method. In general cases, the heat sink layer is formed by the sputtering method. The heat sink layer can be formed just under the adhesive layer, just under the soft-magnetic under layer, just under the seed layer 30, or the like, in consideration of properties required for the magnetic recording medium.

The interlayer 20, which may be formed optionally, is a layer provided for blocking the influence of the crystalline structure of the underlying layer on the crystalline orientation and size of the magnetic crystal grains in the magnetic recording layer 40. Further, when the soft-magnetic under layer is provided, the interlayer 20 is required to be non-magnetic, in order to suppress the magnetic influence on the soft-magnetic under layer. The material for forming the interlayer 20 includes metals such as Pt, Cr and Ta, an NiW alloy, and Cr-based alloys such as CrTi, CrZr, CrTa and CrW. The interlayer 20 can be formed by any process known in the art, such as a sputtering method.

The seed layer 30 has a function to control the size and crystalline orientation of the magnetic crystal grains in the overlying magnetic recording layer 40. The seed layer 30 may have a function to ensure the adhesion between the layer formed under the seed layer 30 and the magnetic recording layer 40. The material for forming the seed layer 30 includes an NaCl-type compound, a spinel-type compound, and a perovskite-type compound. The useful NaCl-type compound includes oxides such as MgO, ZnO, CaO and SrO, and nitrides such as TiN, CrN, and ZrN. The useful spinel-type compound includes $MgAl_2O_4$, $FeAl_2O_4$, $ZnAl_2O_4$, $FeCr_2O_4$, and $MgCrO_4$. The useful perovskite-type compound has a general formula $ABO_3$ wherein A is selected from the group consisting of Ba, Pb, Sr, Mg and Ca, and B is selected from the group consisting of Ti, Zr, Hf and Sn. The NaCl-type compound, the spinel-type compound, and the perovskite-type compound may have stoichiometric composition or non-stoichiometric composition. The seed layer 30 can be formed by any process known in the art, such as a sputtering method (including an RF magnetron sputtering method, a DC magnetron sputtering method, or the like).

The seed layer 30 may be a single layer or have a stacked structure with plural layers. For example, the seed layer 30 having a stacked structure of a first layer consisting of ZnO and a second layer consisting of MgO may be used.

The seed layer 30 may have a thickness of 1 nm or more and 50 nm or less, preferably 2 nm or more and 10 nm or less. Further, in the seed layer 30 having a stacked structure of the first layer consisting of ZnO and the second layer consisting of MgO, the ZnO first layer preferably has a thickness in a range from 1 nm to 20 nm, and the MgO second layer preferably has a thickness in a range from 1 nm to 20 nm. By having the thickness in the above-described range, it is possible to obtain the seed layer 30 having a surface of excellent crystallinity.

The magnetic recording layer 40 of this constitutional example has first magnetic layer 42 which is a continuous film consisting of an ordered alloy, and second magnetic layer 44 having a granular structure consisting of magnetic crystal grains consisting of an ordered alloy and a non-magnetic crystal grain boundary.

The first magnetic layer 42 has a function to promote separation of the magnetic crystal grains in the second magnetic layer 44 having the granular structure. The first magnetic layer 42 preferably has a thickness of 1 nm or more, more preferably 2 nm or more, and the most preferably in a range from 2 nm to 10 nm, in order to achieve the above-described function. The first magnetic layer 42 is a continuous film having a non-granular structure and not containing non-magnetic materials. Further, the first magnetic layer 42 having a thickness in the above-described range becomes the continuous film. In addition, the first magnetic layer 42 having a thickness in the above-described range promotes separation of the magnetic crystal grains in the second magnetic layer 44, without increase in surface roughness of the second magnetic layer 44.

As used herein, the term "continuous" means that a film does not consist of a plurality of discrete parts, but consists of a unitary part so as to cover the surface of the underlying layer. That is, the seed layer having a discrete island-shaped structure comprising FePt as disclosed in the United States Patent Application Publication No. 2013/0170075 is not considered "continuous". On the other hand, the continuous film may have deficient parts. In other words, the "continuous film" may have a "network" or "reticulate" structure comprising a plurality of discrete pinholes. Alternatively, the "continuous film" may have a "labyrinth-like" or "mazy" structure in which the ordered alloy is placed on parts to form "corridors" and the deficient parts constitute "walls".

When the first magnetic layer 42 is the continuous film, the second magnetic layer 44 having the granular structure is formed onto the first magnetic layer 42. In this case, the material of the non-magnetic crystal grain boundary in the second magnetic layer 44 is separated from the magnetic crystal grains, to form the favorable non-magnetic crystal grain boundary. Therefore, the quality of the granular structure of the second magnetic layer 44 improves, leading to favorable magnetic properties of the magnetic recording medium.

The first magnetic layer 42 consists of an ordered alloy comprising at least one first element selected from the group consisting of Fe and Co, and at least one second element selected from the group consisting of Pt, Pd, Au, Ir and Rh. The ordered alloy in the first magnetic layer 42 may further comprise at least one element selected from the group consisting of Ru, Rh, Ir, Ni, Mn, Cu, Au, and Ag, for modification of properties. Desirable modification of properties includes: reduction in the temperature required for ordering of the ordered alloy; and reduction in the heating temperature during recording in the heat-assisted magnetic recording process due to drop in Curie temperature. Further, the ordered alloy in the first magnetic layer 42 preferably has an $L1_0$ ordered structure.

The first magnetic layer 42 can be formed by depositing the predetermined material by a sputtering method. In formation of the first magnetic layer 42, it is possible to use a target comprising the element constituting the above-described ordered alloy at the predetermined ratio. Alternatively, the first magnetic layer 42 may be formed by using a plurality of targets comprising a single element and adjusting electric power applied to the respective targets for controlling the ratio of elements. It is preferable to heat the substrate when forming the first magnetic layer 42. The substrate temperature in this case is in a range from 300° C. to 600° C. By adopting the substrate temperature in this range, it becomes possible to increase the order parameter of the ordered alloy in the first magnetic layer 42.

The second magnetic layer 44 preferably has a thickness in a range from 2 nm to 20 nm, more preferably from 4 nm to 20 nm. By adopting the thickness in the above-described range, it is possible to achieve high perpendicular-to-plane coercive force.

The second magnetic layer 44 consists of an ordered alloy comprising at least one first element selected from the group consisting of Fe and Co, and at least one second element selected from the group consisting of Pt, Pd, Au, Ir and Rh. The ordered alloy in the second magnetic layer 44 may further comprise at least one element selected from the group consisting of Ru, Rh, Ir, Ni, Mn, Cu, Au, and Ag, for modification of properties. Desirable modification of properties includes: reduction in the temperature required for ordering of the ordered alloy; and reduction in the heating temperature during recording in the heat-assisted magnetic recording process due to drop in Curie temperature. Further, the ordered alloy in the second magnetic layer 44 preferably has an $L1_0$ ordered structure.

The non-magnetic crystal grain boundary in the second magnetic layer 44 may be formed of oxides or carbides. The useful oxides include $TiO_2$, $SiO_2$ and $Al_2O_3$. The useful carbides include BC, TiC and SiC.

The second magnetic layer 44 can be formed by depositing the predetermined material by a sputtering method. In formation of the second magnetic layer 44, it is possible to use a target comprising the material for forming the magnetic crystal grains and the material for forming the non-magnetic crystal grain boundary at the predetermined ratio. Alternatively, the second magnetic layer may be formed by using a target comprising the material for forming the magnetic crystal grains and a target comprising the material for forming the non-magnetic crystal grain boundary, and adjusting electric power applied to the respective targets to control the constitutional ratio of the magnetic crystal grains and the non-magnetic crystal grain boundary. Here, a plurality of targets which separately comprise the elements constituting the ordered alloy may be used instead of the target comprising the material for forming the magnetic crystal grains. It is preferable to heat the substrate when forming the second magnetic layer 44. The substrate temperature in this case is in a range from 300° C. to 600° C. By adopting the substrate temperature in this range, it becomes possible to increase the order parameter of the ordered alloy in the second magnetic layer 44.

The protective layer (not shown), which may be formed optionally, can be formed of a material conventionally used in the field of magnetic recording media. Specifically, the protective layer can be formed of non-magnetic metal such as Pt, a carbon-based material such as diamond-like carbon, or silicon-based material such as silicon nitride. The protective layer may be a single layer or have a stacked structure. The stacked structure of the protective layer may be a stacked structure of two types of carbon-based material having different characteristics from each other, a stacked structure of a metal and a carbon-based material, or a stacked structure of a metallic oxide film and a carbon-based material, for example. The protective layer can be formed by any process known in the art such as a sputtering method, a CVD method, or a vacuum deposition method.

The liquid lubricant layer (not shown), which may be formed optionally, can be formed of a material conventionally used in the field of magnetic recording media. For example, perfluoropolyether-based lubricants or the like can be used. The liquid lubricant layer can be formed by a coating method such as a dip-coating method or a spin-coating method.

EXAMPLES

Example 1

A chemically strengthened glass substrate having a smooth surface (N-10 glass substrate manufactured by HOYA CORPORATION) was washed to prepare substrate 10. The washed substrate 10 was brought into a sputtering device. Hereinafter, the stacked body comprising the layers formed in or before the preceding steps is referred to as "substrate to be stacked". Then, a Ta adhesive layer having a thickness of 5 nm was formed by an RF magnetron sputtering method using a Ta target disposed 180 mm apart from the substrate 10 in Ar gas at a pressure of 0.20 Pa. The electric power applied to the target was 200 W.

Then, interlayer 20 having a thickness of 10 nm was formed by an RF magnetron sputtering method using a Pt target disposed 320 mm apart from the substrate to be stacked in Ar gas at a pressure of 0.44 Pa. The electric power applied to the target was 300 W.

Then, a ZnO first layer having a thickness of 10 nm was formed by an RF magnetron sputtering method using a ZnO target disposed 180 mm apart from the substrate to be stacked in Ar gas at a pressure of 0.20 Pa. The electric power applied to the ZnO target was 500 W. Subsequently, a MgO second layer having a thickness of 10 nm was formed by an RF magnetron sputtering method using a MgO target disposed 240 mm apart from the substrate to be stacked in Ar gas at a pressure of 0.18 Pa, to obtain seed layer 30 having a stacked structure of the ZnO first layer and the MgO second layer. The electric power applied to the MgO target was 500 W.

Next, the substrate to be stacked was heated to a temperature of 450° C. FePt first magnetic layer 42 having a thickness of 2 nm was formed by an RF magnetron sputtering method using a FePt target disposed 240 mm apart from the substrate to be stacked in Ar gas at a pressure of 0.90 Pa. The electric power applied to the target was 300 W.

Subsequently, in the state that the substrate to be stacked was heated to a temperature of 450° C., FePt—$TiO_2$ second magnetic layer 44 having a thickness of 4 nm was formed by an RF magnetron sputtering method using a FePt target and a $TiO_2$ target disposed 240 mm apart from the substrate to be stacked in Ar gas at a pressure of 0.90 Pa. A magnetic recording medium having magnetic recording layer 40 having a stacked structure of the FePt first magnetic layer 42 which was a continuous film and the FePt—$TiO_2$ second magnetic layer 44 having a granular structure was obtained as described above. The electric power applied to the $TiO_2$ target was 500 W, and the electric power applied to the FePt target was 198 W. The resultant second magnetic layer 44 contained 25% by volume of $TiO_2$.

Example 2

A magnetic recording medium was obtained by repeating the procedure of Example 1, except that the second magnetic layer 44 was formed in accordance with the procedure described below. The resultant magnetic recording medium had the magnetic recording layer 40 having a stacked structure of the FePt first magnetic layer 42 which was a continuous film and the FePt—$SiO_2$ second magnetic layer 44 having a granular structure.

In the state that the substrate to be stacked was heated to a temperature of 450° C., the FePt—$SiO_2$ second magnetic layer 44 having a thickness of 4 nm was formed by an RF magnetron sputtering method using a FePt target and a $SiO_2$ target disposed 240 mm apart from the substrate to be stacked in Ar gas at a pressure of 0.90 Pa. The electric power applied to the $SiO_2$ target was 500 W, and the electric power applied to the FePt target was 212 W. The resultant second magnetic layer 44 contained 25% by volume of $SiO_2$.

Example 3

A magnetic recording medium was obtained by repeating the procedure of Example 1, except that the second magnetic layer 44 was formed in accordance with the procedure described below. The resultant magnetic recording medium had the magnetic recording layer 40 having a stacked structure of the FePt first magnetic layer 42 which was a continuous film and the FePt—$Al_2O_3$ second magnetic layer 44 having a granular structure.

In the state that the substrate to be stacked was heated to a temperature of 450° C., the FePt—$Al_2O_3$ second magnetic layer 44 having a thickness of 4 nm was formed by an RF magnetron sputtering method using a FePt target and a $Al_2O_3$ target disposed 240 mm apart from the substrate to be stacked in Ar gas at a pressure of 0.90 Pa. The electric power applied to the $Al_2O_3$ target was 500 W, and the electric power applied to the FePt target was 187 W. The resultant second magnetic layer 44 contained 25% by volume of $Al_2O_3$.

Comparative Example 1

A magnetic recording medium was obtained by repeating the procedure of Example 1, except that the first magnetic layer 42 was not formed. The resultant magnetic recording medium had the magnetic recording layer 40 consisting of the FePt—$TiO_2$ second magnetic layer 44 having a granular structure only.

Comparative Example 2

A magnetic recording medium was obtained by repeating the procedure of Example 2, except that the thickness of the first magnetic layer 42 was changed to 0.5 nm. The resultant magnetic recording medium had the magnetic recording layer 40 having a stacked structure of the first magnetic layer 42 having an island-shaped structure and the FePt—$SiO_2$ second magnetic layer 44 having a granular structure.

Comparative Example 3

A magnetic recording medium was obtained by repeating the procedure of Example 2, except that the first magnetic layer 42 was not formed. The resultant magnetic recording medium had the magnetic recording layer 40 consisting of the FePt—$SiO_2$ second magnetic layer 44 having a granular structure only.

Comparative Example 4

A magnetic recording medium was obtained by repeating the procedure of Example 3, except that the first magnetic layer 42 was not formed. The resultant magnetic recording medium had the magnetic recording layer 40 consisting of the FePt—$Al_2O_3$ second magnetic layer 44 having a granular structure only.

(Evaluation 1)

Figure 2A:
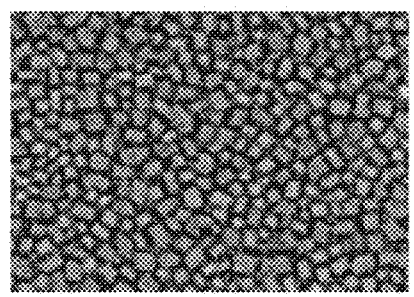
FIGS. 2A-2E are diagrams each showing separation state of the magnetic crystal grains in the magnetic recording layer, FIG. 2A being an SEM photograph of the magnetic recording layer of Example 1, FIG. 2B being an SEM photograph of the magnetic recording layer of Example 2, FIG. 2C being an SEM photograph of the magnetic recording layer of Example 3, FIG. 2D being a TEM photograph of the magnetic recording layer of Comparative Example 1, and FIG. 2E being a TEM photograph of the magnetic recording layer of Comparative Example 3.
Figure 2B:
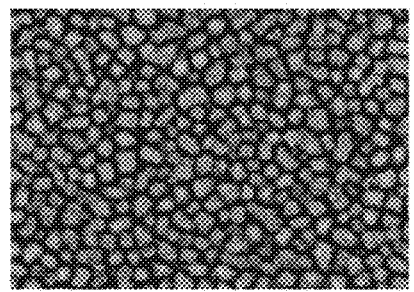
Figure 2C:
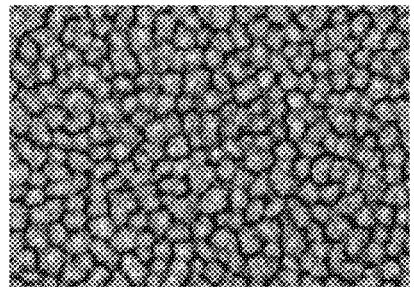
Figure 2D:
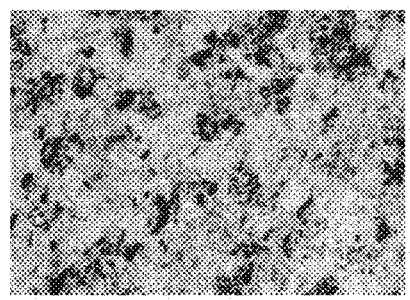
Figure 2E:
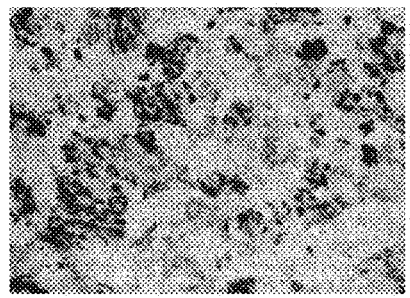

The structures of the magnetic recording layers 40 (in particular, the second magnetic layers 44) were analyzed with a scanning electron microscope (SEM) or a transmission electron microscope (TEM), for the magnetic recording media of Examples 1-3, and Comparative Examples 1 and 3. FIG. 2A shows an SEM photograph of the magnetic recording layer of Example 1, FIG. 2B shows an SEM photograph of the magnetic recording layer of Example 2, and FIG. 2C shows an SEM photograph of the magnetic recording layer of Example 3. Besides, FIG. 2D shows a TEM photograph of the magnetic recording layer of Comparative Example 1, and FIG. 2E shows a TEM photograph of the magnetic recording layer of Comparative Example 3.

The crystallinity of the magnetic recording layers 40 was evaluated by an X-ray diffraction (XRD) method, for the magnetic recording media of Examples 1-3 and Comparative Examples 1-4. In particular, the integrated intensity of the FePt (001) peak around the position of 2θ of from 24.0° to 24.2° was measured, the measurement unit being counts per second (cps) by angle (degree). The results are shown in Table 1.

Further, perpendicular-to-plane coercive force Hc_out was determined by measuring a magnetization curve in the perpendicular-to-plane direction with a vibrating sample magnetometer (VSM), for the magnetic recording media of Examples 1-3 and Comparative Examples 1-4. The results are shown in Table 1. As used herein, the term "perpendicular-to-plane direction" means a direction along the normal of the principal plane of the magnetic recording medium. As used herein, the term "in-plane direction" means a direction parallel to the principal plane of the magnetic recording medium.

TABLE 1

Effect of the Presence of First magnetic layer

| | Non-magnetic crystal grain boundary in Second magnetic layer | First magnetic layer | Integrated Intensity of FePt (001) peak*[1] | Perpendicular-to-plane coercive force Hc_out*[2] |
|---|---|---|---|---|
| Ex. 1 | $TiO_2$ | continuous film | 3476 | 14.3 |
| C. Ex. 1 | | none | 0 | 0 |
| Ex. 2 | $SiO_2$ | continuous film | 3792 | 12.1 |
| C. Ex. 2 | | island-shaped structure*[3] | 910 | 0.3 |
| C. Ex. 3 | | none | 0 | 0 |
| Ex. 3 | $Al_2O_3$ | continuous film | 3703 | 11.4 |
| C. Ex. 4 | | none | 850 | 1.4 |

*[1] in cps × deg.
*[2] in kOe, 1 kOe = 79.6 A/mm
*[3] Thickness is 0.5 nm

The following facts can be understood from comparison between Example 1 and Comparative Example 1 in which the non-magnetic crystal grain boundary in the second magnetic layer 44 is $TiO_2$, comparison among Example 2, Comparative Example 2 and Comparative Example 3 in which the non-magnetic crystal grain boundary in the second magnetic layer 44 is $SiO_2$, and comparison between Example 3 and Comparative Example 4 in which the non-magnetic crystal grain boundary in the second magnetic layer 44 is $Al_2O_3$.

(1) The magnetic crystal grains of the second magnetic layer 44, having FePt—X (X=$TiO_2$, $SiO_2$, or $Al_2O_3$) granular structures formed on the first magnetic layer 42 which is a FePt continuous film, are well separated from each other and have sufficiently small sizes, as apparent from FIGS. 2(a) to 2(c). On the contrary, no definite crystal grain boundaries are observed in the second magnetic layer 44 formed directly on the MgO second layer of the seed layer 30 without the first magnetic layer 42, as apparent from FIGS. 2(d) and 2(e). It is understood from the above results that the first magnetic layer 42, which is the FePt continuous film, is effective to separation of the magnetic crystal grains in the FePt—X (X=TiO$_2$, SiO$_2$, or Al$_2$O$_3$) granular structures. Although the details remain unclear, the applicant considers that this result is due to wettability of the oxides which are the material of the non-magnetic crystal grain boundary in the second magnetic layer 44. More specifically, the applicant considers that, when the oxide is deposited on the FePt continuous film, the deposited oxide easily moves so as not to inhibit the formation of FePt crystal grains. On the other hand, when the oxide is deposited on the MgO layer, the oxide cannot move from the deposited position, so that the oxide inhibits the formation of FePt crystal grains.

(2) It can be understood from Table 1 that L1$_0$ ordering of the FePt alloy in the magnetic recording layer 40 is promoted by forming the second magnetic layer 44 having the FePt—X granular structure onto the first magnetic layer 42 which is the FePt continuous film. On the other hand, it is understood that the integrated intensity of an FePt(001) peak is small in Comparative Example 2 in which the second magnetic layer 44 having the FePt—X granular structure onto the first magnetic layer 42 having the island-shaped structure. This observation shows that L1$_0$ ordering of the FePt alloy in the second magnetic layer 44 is insufficient. Further, it is understood that L1$_0$ ordering of the FePt alloy in the magnetic recording layer 40 does not occur, in the second magnetic layer 44 directly formed on the MgO second layer of the seed layer 30. Although the details remain unclear, the applicant considers that this result is also due to wettability of the oxides which are the material of the non-magnetic crystal grain boundary in the second magnetic layer 44. More specifically, the applicant considers that, when the oxide is deposited on the FePt continuous film, the deposited oxide easily moves so as not to inhibit L1$_0$ ordering of FePt. On the other hand, when the oxide is deposited on the MgO layer, the oxide cannot move from the deposited position, so that the oxide inhibits L1$_0$ ordering of FePt.

(3) It is understood that the axis of easy magnetization of the FePt ordered alloy in the magnetic recording layer 40 orients in the perpendicular-to-plane direction to obtain large perpendicular-to-plane coercive force Hc_out by forming the second magnetic layer 44 having the FePt—X granular structure on the first magnetic layer 42 which is the FePt continuous film. On the other hand, no perpendicular-to-plane coercive force Hc_out is observed in the magnetic recording media of Comparative Examples 1 and 3, since ordering of the FePt alloy in the magnetic recording layer per se does not occur due to formation of the second magnetic layer 44 directly on the MgO second layer of the seed layer 30. Further, the perpendicular-to-plane coercive force Hc_out is very small in the magnetic recording medium of Comparative Example 4, although L1$_0$ ordering of the FePt alloy in the magnetic recording layer 40 occurs to some degree. It is understood that the large perpendicular-to-plane coercive force Hc_out suitable to perpendicular magnetic recording is obtained in the presence of the first magnetic layer 42 which is the FePt continuous film. Still further, the magnetic recording medium of Comparative Example 2 exhibits significantly small perpendicular-to-plane coercive force Hc_out, in which the second magnetic layer 44 having the FePt—SiO$_2$ granular structure is formed on the first magnetic layer 42 having the island-shaped structure. Therefore, as understood from the above results, it is important that the FePt first magnetic layer 42 is the continuous film covering the surface of the MgO second layer of the seed layer 30.

Comparative Example 5

A magnetic recording medium was obtained by repeating the procedure of Example 1, except that the first magnetic layer 42 was formed in accordance with the procedure described below, and the thickness of the second magnetic layer 44 was changed to 3 nm. The resultant magnetic recording medium had the magnetic recording layer 40 having a stacked structure of the FePt—C first magnetic layer 42 having a granular structure and the FePt—SiO$_2$ second magnetic layer 44 having a granular structure.

The substrate to be stacked was heated to a temperature of 450° C. Then, FePt—C first magnetic layer 42 having a thickness of 2 nm was formed by an RF magnetron sputtering method using a FePt target and a C target disposed 240 mm apart from the substrate to be stacked in Ar gas at a pressure of 0.90 Pa. The electric power applied to the FePt target was 100 W, and the electric power applied to the C target was 500 W. The resultant first magnetic layer 42 contained 40% by volume of C.

Comparative Example 6

A magnetic recording medium was obtained by repeating the procedure of Example 3, except that the first magnetic layer 42 was formed by the same procedure as that of Comparative Example 5, and the thickness of the second magnetic layer 44 was changed to 3 nm. The resultant magnetic recording medium had the magnetic recording layer 40 having a stacked structure of the FePt—C first magnetic layer 42 having a granular structure and the FePt—Al$_2$O$_3$ second magnetic layer 44 having a granular structure.

(Evaluation 2)

The crystallinity of the magnetic recording layers 40 was evaluated by an X-ray diffraction (XRD) method, for the magnetic recording media of Comparative Examples 5 and 6. In particular, the integrated intensity of the FePt(001) peak around the position of 2θ of from 24.0° to 24.2° was measured. In addition, for comparison from which the effect of the thickness is excluded, normalized values of the integrated intensity was determined by dividing the integrated intensity of the FePt (001) peak by the total thickness of the magnetic recording layer 40, for the magnetic recording media of Examples 1 and 3, and Comparative Examples 5 and 6, the unit of the normalized values being counts per second (cps) by angle (degree) per nanometer (nm). The results are shown in Table 2.

Further, perpendicular-to-plane coercive force Hc_out was determined by measuring a magnetization curve in the perpendicular-to-plane direction with a vibrating sample magnetometer (VSM), for the magnetic recording media of Comparative Examples 5 and 6. Still further, in-plane coercive force Hc_in was determined by measuring a magnetization curve in the in-plane direction with the vibrating sample magnetometer (VSM), for the magnetic recording media of Examples 1 and 3, and Comparative Examples 5 and 6. The results are shown in Table 2.

Further, the magnetic anisotropy constant Ku was determined by evaluating the dependence of spontaneous magnetization on the angle at which the magnetic field is applied, by means of a PPMS apparatus (Physical Property Measurement System, manufactured by Quantum Design, Inc.). The methods described in the publications: R. F. Penoyer, "Automatic Torque Balance for Magnetic Anisotropy Measurement", The Review of Scientific Instruments, August 1959, Vol. 30, No. 8, pp. 711-714; and Soshin Chikazumi, "Physics of ferromagnetism Vol. II", Shokabo Co., Ltd., pp. 10-21 were used in determination of the magnetic anisotropy constant Ku. The results are shown in Table 2.

TABLE 2

Effect of Material of First Magnetic Layer

| Second Magnetic Layer | | | | Coercive Force (kOe)[*3] | | Magnetic Anisotropy Constant Ku $(\times 10^7 \text{ erg/cc})$[*4] |
|---|---|---|---|---|---|---|
| Non-magnetic crystal grain boundary | First Magnetic Layer | FePt(001) peak Integrated Intensity | | Perpendicular-to-Plane Hc_out | In-plane Hc_in | |
| | | Measured [*1] | Normalized [*2] | | | |
| Ex. 1 | $TiO_2$ | FePt | 3476 | 579 | 14.3 | 0.3 | 0.98 |
| C. Ex. 5 | | FePt—C | 2829 | 566 | 7.8 | 0.5 | 0.91 |
| Ex. 3 | $Al_2O_3$ | FePt | 3703 | 617 | 11.4 | 0.5 | 1.4 |
| C. Ex. 6 | | FePt—C | 2401 | 480 | 9.8 | 0.6 | 1.3 |

[*1] in (cps × deg.)
[*2] in (cps × deg.)/nm
[*3] 1 kOe = 79.6 A/mm
[*4] $10^7$ erg/cc = 1 $J/cm^3$ In comparison between Example 1 and Comparative Example 5 in which the non-magnetic crystal grain boundary in the second magnetic layer 44 is $TiO_2$, and in comparison between Example 3 and Comparative Example 6 in which the non-magnetic crystal grain boundary in the second magnetic layer 44 is $Al_2O_3$, it is understood that the magnetic recording media of Examples 1 and 3 having the first magnetic layer 42 consisting of the FePt continuous film exhibit larger normalized values of integrated intensities of FePt(001) peak than those of the magnetic recording media of Comparative Examples 5 and 6 having the first magnetic layer 42 having the FePt—C granular structure. From this result, it is understood that the $L1_0$ ordering of the FePt alloy in the first magnetic layer 42 and the FePt alloy in the magnetic crystal grains in the second magnetic layer 44 is promoted by forming the second magnetic layer 44 having FePt—X (X=$TiO_2$, $SiO_2$, or $Al_2O_3$) granular structures onto the first magnetic layer 42 consisting of the FePt continuous film.

In addition, the magnetic recording media of Examples 1 and 3 exhibit larger perpendicular-to-plane coercive force Hc_out and smaller in-plane coercive force Hc_in, in comparison with the magnetic recording media of Comparative Examples 5 and 6. Further, the magnetic recording media of Examples 1 and 3 exhibit larger magnetic anisotropy constant Ku, in comparison with the magnetic recording media of Comparative Examples 5 and 6. From these results, it is understood that orientation of the axis of easy magnetization of the FePt ordered alloy in the magnetic recording layer is promoted by forming the second magnetic layer 44 having the FePt—X granular structures onto the first magnetic layer 42 consisting of the FePt continuous film.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. All of the patent applications and documents cited herein are incorporated herein by reference in their all entities.

What is claimed is:

1. A magnetic recording medium, comprising:
   a substrate;
   a seed layer disposed on the substrate, and consisting of a material selected from the group consisting of an NaCl-type compound, a spinel-type compound, and a perovskite-type compound; and
   a magnetic recording layer including
   a first magnetic layer formed of a continuous film, and being made of an ordered alloy, and
   a second magnetic layer having a granular structure including magnetic crystal grains that is made of an ordered alloy and a non-magnetic crystal grain boundary, the second magnetic layer being directly adjacent to the first magnetic layer,
   wherein the ordered alloy in the first magnetic layer and the ordered alloy in the second magnetic layer are FePt consisting of the same elements.

2. The magnetic recording medium according to claim 1, wherein
   the NaCl-type compound is selected from the group consisting of MgO, ZnO, CaO, SrO, TiN, CrN, and ZrN,
   the spinel-type compound is selected from the group consisting of $MgAl_2O_4$, $FeAl_2O_4$, $ZnAl_2O_4$, $FeCr_2O_4$, and $MgCrO_4$, and
   the perovskite-type compound has a general formula $ABO_3$ wherein A is selected from the group consisting of Ba, Pb, Sr, Mg and Ca, and B is selected from the group consisting of Ti, Zr, Hf and Sn.

3. The magnetic recording medium according to claim 1, wherein the non-magnetic crystal grain boundary in the second magnetic layer comprises an oxide.

4. The magnetic recording medium according to claim 3, wherein the oxide is selected from the group consisting of $TiO_2$, $SiO_2$, and $Al_2O_3$.

5. The magnetic recording medium according to claim 1, wherein the seed layer is formed directly on the substrate.

6. The magnetic recording medium according to claim 1, further comprising an additional layer disposed between the substrate and the seed layer, the additional layer including one of an adhesive layer, a soft-magnetic underlayer and a heat sink layer.

7. The magnetic recording medium according to claim 1, wherein the first magnetic layer has a thickness in a range of 2 nm to 10 nm.

8. The magnetic recording medium according to claim 1, wherein the first magnetic layer is directly adjacent to the seed layer.

9. The magnetic recording medium according to claim 1, wherein the first magnetic layer has a thickness of 1 nm or more.

10. The magnetic recording medium according to claim 1, wherein the first magnetic layer has a thickness of 2 nm or more.

\* \* \* \* \*